(12) United States Patent
Schneider et al.

(10) Patent No.: US 12,445,440 B2
(45) Date of Patent: Oct. 14, 2025

(54) CONDUCTING MULTI-PARTY AUTHENTICATION IN A PRIVACY PRESERVING MANNER

(71) Applicant: NVIDIA Corporation, Santa Clara, CA (US)

(72) Inventors: Christopher Ian Schneider, Scotland (GB); Amy Leigh Schneider Rose, Chapel Hill, NC (US); Daniel Rohrer, Cary, NC (US); Mark Overby, Snohomish, WA (US)

(73) Assignee: NVIDIA Corporation, Santa Clara, CA (US)

( * ) Notice: Subject to any disclaimer, the term of this patent is extended or adjusted under 35 U.S.C. 154(b) by 372 days.

(21) Appl. No.: 18/050,838

(22) Filed: Oct. 28, 2022

(65) Prior Publication Data
US 2024/0146730 A1    May 2, 2024

(51) Int. Cl.
H04L 9/32        (2006.01)
H04L 9/08        (2006.01)
H04L 9/40        (2022.01)

(52) U.S. Cl.
CPC ........ H04L 63/0884 (2013.01); H04L 9/0833 (2013.01); H04L 9/3236 (2013.01)

(58) Field of Classification Search
CPC . H04L 63/0884; H04L 9/0833; H04L 9/3236; H04L 9/32
See application file for complete search history.

(56) References Cited

U.S. PATENT DOCUMENTS

2015/0016461 A1* 1/2015 Qiang ................. H04L 61/5046
                                                                    370/392
2021/0336961 A1* 10/2021 Rao ........................ H04L 63/107

FOREIGN PATENT DOCUMENTS

KR        20180052346 A  *  5/2018   ........... H04L 61/103

OTHER PUBLICATIONS

Hun et al. Korean Publication 20180052346 (machine translation) (Year: 2018).*

* cited by examiner

Primary Examiner — Jung W Kim
Assistant Examiner — Howard H. Louie
(74) Attorney, Agent, or Firm — Taylor Duma L.L.P.

(57) ABSTRACT

In various examples, a user may be authenticated without disclosing any confidential or private information of the user. An independent accumulator stores user confidential information, and accumulates items issued by various parties for the user. When another entity requests to verify the item and the user, the accumulator may verify the user by verifying his or her possession of the item and his or her private information. The accumulator may also verify the item with the issuing party and verify that the item was intended for the user. Once verification has occurred, the accumulator informs the requesting entity that their request is confirmed. In this manner, entities may verify items of a user, without requiring the user to disclose any of his or her confidential or private information to the requestor.

24 Claims, 9 Drawing Sheets

CONDUCTING MULTI-PARTY AUTHENTICATION IN A PRIVACY PRESERVING MANNER

BACKGROUND

Contemporary authentication processes typically require disclosure of confidential or personal information. People desiring access to various goods or services must often show some form of personal identification, or the like. For example, those desiring prescription medications may be required to show their driver's license to a pharmacist to prove that they are the ones for whom a particular prescription is intended, and those desiring access to banking services may be required to verify their identity and/or disclose their account or member numbers. Such disclosures are often made to unsecured or minimally secured data repositories that present risks of data theft. These disclosures also risk undesired disclosure of sensitive personal information when the parties receiving such disclosures are untrustworthy, as well as inadvertent disclosure to anyone who may be within earshot or view.

SUMMARY

Embodiments of the present disclosure relate to conducting multi-party authentication in a privacy preserving manner. Systems and methods are disclosed that may provide trustworthy authentication without disclosure of sensitive personal or confidential information.

In at least one embodiment, the disclosure relates to systems and methods for authenticating a user, without disclosing any confidential or private information of the user. An independent accumulator may store user confidential information, and accumulates items issued by various parties for the user. When another entity requests to verify the item and the user, the accumulator may verify the user by verifying his or her possession of the item and his or her private information. The accumulator may also verify the item with the issuing party and verify that the item was intended for the user. Once verification has occurred, the accumulator may inform the requesting entity that their request is confirmed. In this manner, entities may verify items of a user, without requiring the user to disclose any of his or her confidential or private information to the requestor.

BRIEF DESCRIPTION OF THE DRAWINGS

The present systems and methods for conducting multi-party authentication in a privacy preserving manner are described in detail below with reference to the attached drawing figures, wherein.

DETAILED DESCRIPTION

Figure 1:
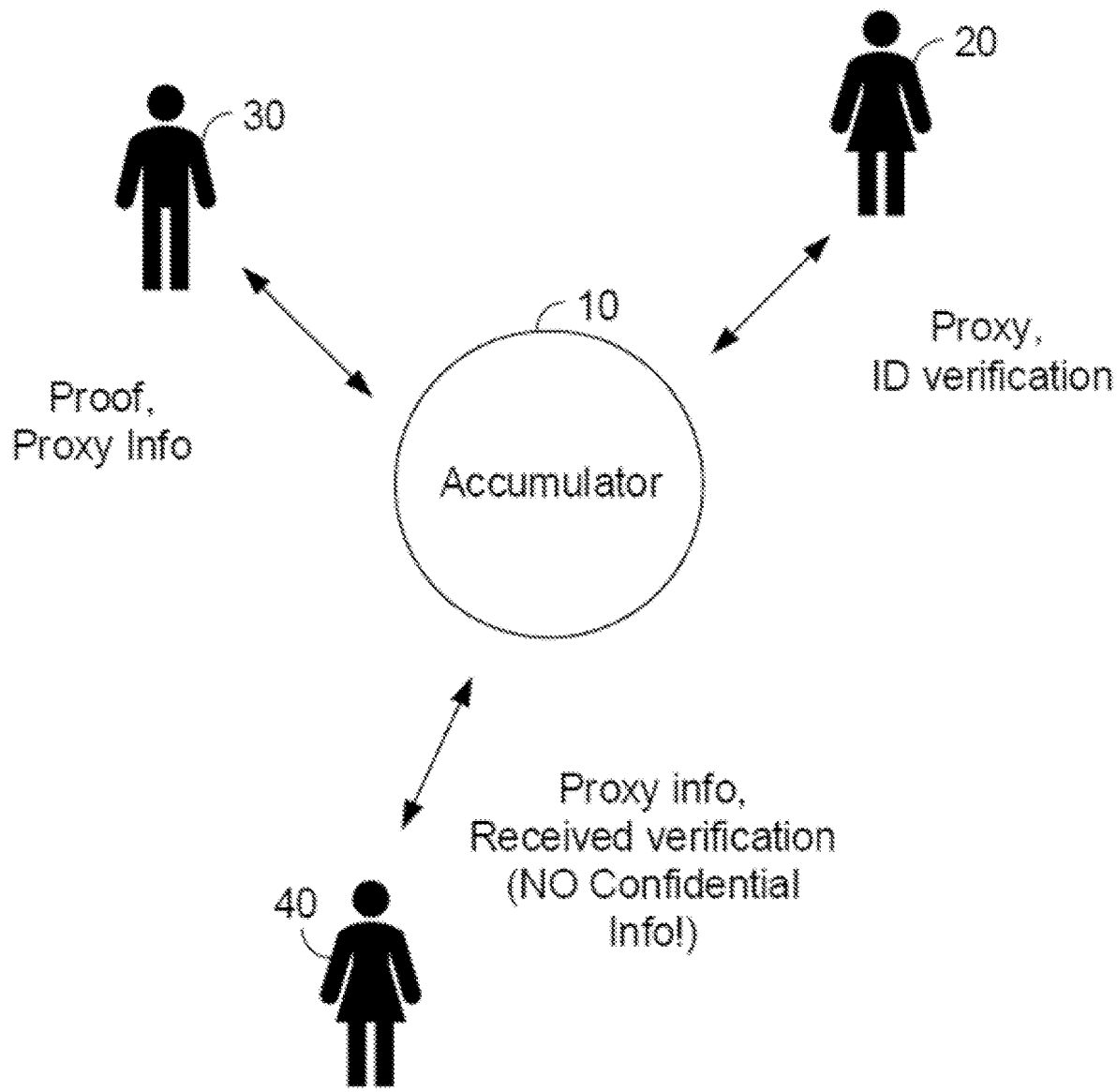
FIG. 1 conceptually illustrates operation of a system for performing multi-party authentication without disclosing confidential information, in accordance with some embodiments of the present disclosure.

Systems and methods are disclosed related to conducting multi-party authentication in a privacy preserving manner. Disclosed approaches may be used to provide trustworthy authentication without disclosure of sensitive personal or confidential information.

In at least one embodiment, an independent accumulator is established to hold confidential information of a user and oversee the authentication process, where this accumulator may be a neutral party that can be trusted by all parties of an authentication process. In addition to user confidential information, the accumulator may receive other user information for which authentication may be required. For example, medical prescriptions written for a specific user may be submitted to the accumulator by a prescribing doctor. Subsequently, other parties may wish to verify this information. For example, a pharmacist filling the prescription may wish to verify the prescription, to confirm that it is a valid prescription which was written for that user. The accumulator may conduct this verification, informing the other party, e.g., the pharmacist, of a successful verification without divulging any of the user's confidential information.

In at least one embodiment, the accumulator performs verification based at least on generating a proxy or unique identifier for each set of other user information it receives. The proxy may be an encrypted version of the other user information. Thus, when a requestor sends a request to verify the other information, along with the proxy, the accumulator seeks verification from the user of both the proxy and the user's confidential information. This request may be satisfied, for example, when the user submits a matching copy of the proxy and confirms his or her confidential information. Thus, for instance, when confirming a prescription, the user may submit his or her prescription with the proxy value he or she received, along with the required personal or confidential information, e.g., personal identification. The accumulator may also verify the other user information with the issuer of that information, e.g., may verify the prescription with the doctor who submitted the prescription.

Once these parties have verified their respective information, the accumulator may send the requestor a confirmation of the other user information. In at least one embodiment, the confirmation does not include any of the user's confidential information. As such, the information transmitted may be solely a confirmation or lack thereof, e.g., a yes/no answer to the verification request. That is, the accumulator may merely indicate whether verification has successfully occurred or not. In this manner, the requestor may seek information verification from a trusted source, e.g., the accumulator, without being required to trust the issuer of the information or the user. So long as all parties involved trust the accumulator to perform verification, verification may be performed without the requesting party receiving confidential or personal information of the user.

In at least one embodiment, the proxy may include any unique identifier. As one example, the proxy may be a hash of the other user information. For security purposes, the proxy may include one or more encrypted values, generated using an acceptable encryption method or process such as, for instance, RSA-2048 encryption. Accordingly, the accumulator may RSA-2048 encrypt the other user information or its hash values and store this other user information in its encrypted form. Encrypted values, public keys, or the like may be passed back to the issuer or other recipient of the other user information, so that requestors may transmit these keys along with their requests. Verification requests may be denied if no proper key is submitted.

In at least one embodiment, multiple parties or entities may each submit other user information. In this case, the accumulator may seek or require verification from each of these parties. For example, multiple doctors may submit different prescriptions for the same user. Upon receiving a request to verify a particular prescription, the accumulator may seek verification of only that particular prescription with the corresponding doctor or the accumulator may seek verification from each doctor who has submitted a prescription for that user.

Thus, one or more embodiments of the disclosure may allow requestors to verify various items for a user without actually receiving any of the user's private or sensitive information. In particular, accumulators may seek verification of the user's private information with the user, and separately verify the requestor's possession of the proxy with the issuer of the information the proxy is based on. Once these separate verifications occur, the accumulator may send the requestor a verification of the request, without providing the user's private information. In at least one embodiment, a user may correspond to one or more of a user account, a user device, and/or a client device (e.g., with respect an accumulator and/or one or more servers).

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

FIG. 1 conceptually illustrates operation of a system for performing multi-party authentication without disclosing confidential information, according to embodiments of the disclosure. Authentication processes of embodiments of the disclosure employ an accumulator 10 (e.g., at one or more servers), which may be a computer-based agent that stores private user information and conducts authentications. An exemplary authentication process may involve a user 20, or an individual that may have private or confidential information, such as an identification (ID), that is securely stored by accumulator 10. The authentication process may also involve an issuer 30, which may be an individual that issues a proof, or any document or other information concerning user 20 that someone may wish to verify. For example, as further described below, a proof may be a prescription for user 20, and the issuer 30 may be the doctor who issues the prescription. Accumulator 10 generates and stores a proxy or unique representation of the proof submitted by issuer 30, returning the proxy to the issuer 30. Later, another party, i.e., a verifier 40, may wish to verify the proof. For instance, when the issuer 30 is a doctor and the proof is a prescription for user 20, the verifier 40 may be a pharmacist who seeks to verify the prescription prior to distributing medication to user 20.

The verifier 40 requests verification of the proof by submitting the proof and associated proxy to accumulator 10. That is, to verify that the proof is correct and is for user 20, the verifier 40 requests verification of the proof from accumulator 10 (also submitting the proxy), rather than requesting verification from user 20. Accumulator 10 then verifies the proof via information from user 20 and optionally issuer 30. For example, accumulator 10 may request that issuer 30 confirm the contents of the proof and that the proof is intended for user 20. Issuer 30 may satisfy this request by confirming the proof and submitting the proxy. Further to this example, accumulator 10 may verify the identity of user 20 by requesting the user 20 to verify the personal information that accumulator 10 has stored for user 20. That is, the accumulator 10 requests user 20 to verify both the proxy and his or her stored personal information.

Upon verifying with both user 20 and issuer 30, accumulator 10 issues a confirmation of the request to verifier 40. That is, upon verifying the proof with both issuer 30 and user 20, the accumulator 10 communicates to verifier 40 that the proof has been verified. Notably, accumulator 10 does not transmit any of its stored personal information of user 20 to verifier 40. It only informs verifier 40 that such information has been verified. Verification of personal information is instead conducted with user 20.

In this manner, accumulator 10 verifies proofs for verifier 40, allowing verifier 40 to perform any actions in the same manner as if verifier 40 received the personal information of user 20. For example, if verifier 40 is a pharmacist, he or she may properly issue medication according to the prescription (proof) as if user 20 had shown his or her ID to the verifier 40 directly. Embodiments of the disclosure thus allow for verification of the proof without the user 20 revealing his or her private information to verifier 40. Disclosure of the ID of user 20 is only to accumulator 10, which acts as an independent middleman verifying the ID and proof without divulging the ID to any other party.

Figure 2:
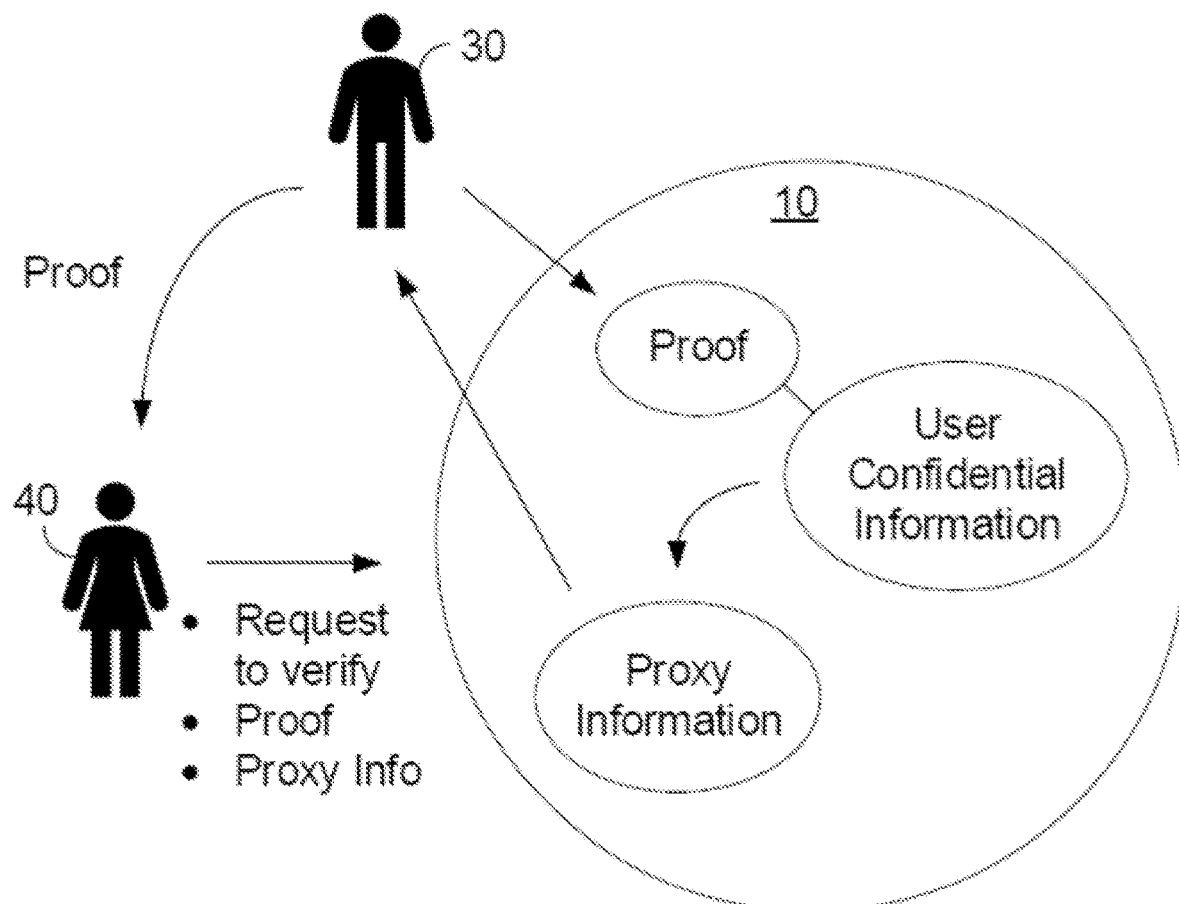
FIGS. 2-3 conceptually illustrate further details of multi-party authentication performed without disclosing confidential information, in accordance with some embodiments of the present disclosure.
Figure 3:
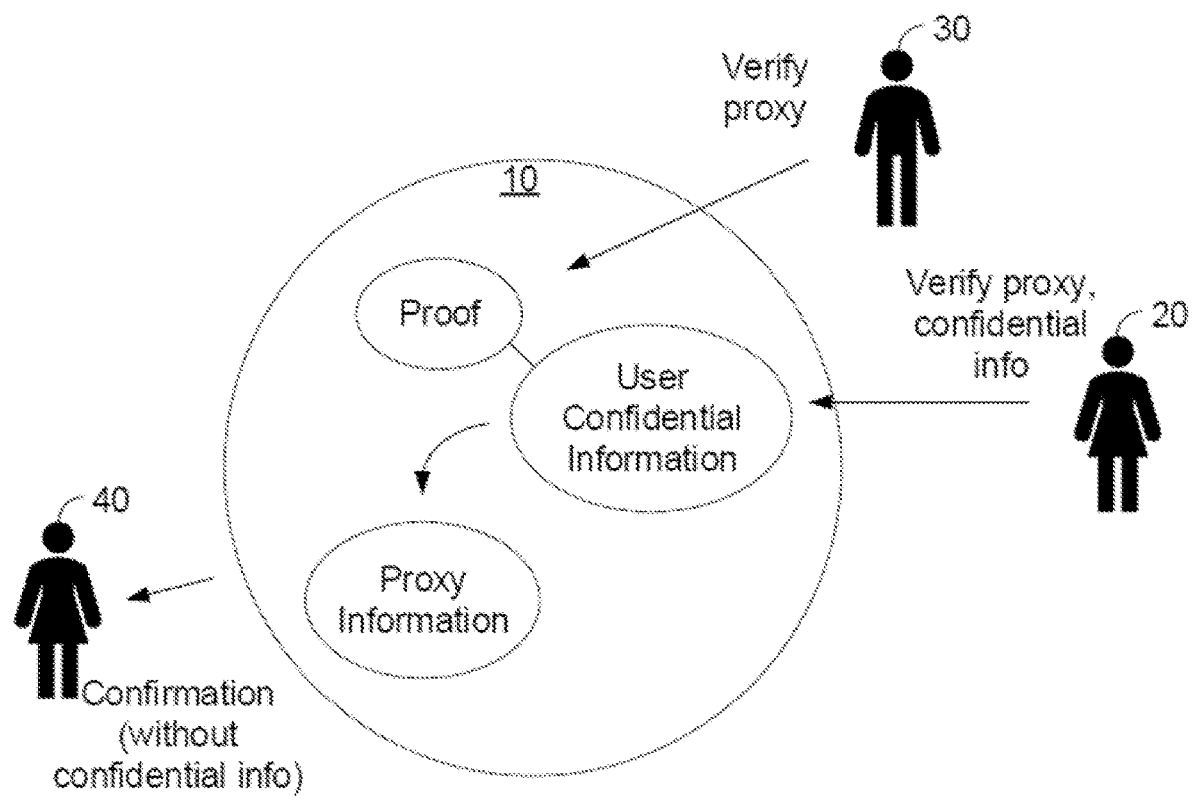

FIGS. 2-3 conceptually illustrate further details of multi-party authentication performed without disclosing confidential information, according to embodiments of the disclosure. More specifically, FIGS. 2-3 illustrate further details of the process described above in connection with FIG. 1. As can be seen in FIG. 2, an accumulator 10 may maintain confidential or personal information of various users, including user 20, in secure storage. Issuer 30 also submits a proof, e.g., a prescription, to accumulator 10, and informs accumulator 10 that this proof is associated with user 20. Accumulator 10 then stores the proof and its association with user 20. Upon receipt of this proof, accumulator 10 also generates proxy information that serves as an anonymous identifier of the proof. For example, accumulator 10 generates a unique representation of the submitted proof, and sends this representation back to issuer 30. The proof and its associated proxy are together used in future verification procedures. The proxy information may be any unique representation of a proof that can be translated back to the original proof for verification purposes. As one example, the proxy information may be an encrypted hash of the proof, where the hash is encrypted by any method or process, e.g., RSA-2048 encryption or the like, perhaps along with a corresponding encryption key.

The issuer 30 may then transfer the proof and its associated proxy information to another party, such as verifier 40, who may seek to verify the proof prior to carrying out any actions that the proof may entail. To verify the proof, verifier 40 submits a verification request to accumulator 10, along with the proof and proxy that he or she received. It is also noted that the verifier 40 may receive the proof and proxy from any source. For example, proof and proxy information may be received from the user 20 instead of (or in addition to) the verifier 40.

FIG. 3 illustrates the actions taken by accumulator 10 upon receiving a verification request from verifier 40. The accumulator 10 decrypts the received proxy perhaps using a received encryption key. If the decrypted proxy does not match the stored proxy corresponding to the proof originally received from issuer 30, the accumulator 10 returns a result of no verification to the verifier 40. If the decrypted proxy matches the stored proxy from issuer 30, the accumulator 10 then verifies the proof with the user 20 and optionally the issuer 30 as well. In particular, accumulator 10 requests the user 20 to verify the proxy, and to verify his or her identity by verifying his or her stored confidential information. The accumulator 10 may also request the issuer 30 to verify both the contents of the proof and that it was issued for the user 20, such as by submitting the proxy, and perhaps also submitting another copy of the proof.

If either the user 20 or issuer 30 fail to properly verify their respective information, the accumulator can return a result of no verification to the verifier 40. Alternatively, if both user 20 and issuer 30 properly verify their respective information, the accumulator 10 returns a verification result to verifier 40, indicating that the proof is proper and intended for user 20. Having verified the proof, verifier 40 may then take appropriate actions as if the proof was proper, such as fulfilling a prescription, initiating a service for user 20, or the like.

The process of FIGS. 2-3 verifies a proof submitted by verifier 40, according to information submitted to accumulator 10 by user 20 and issuer 30. That is, verification information submitted by user 20 and issuer 30 is seen only by accumulator 10, and not by verifier 40. In this manner, embodiments of the disclosure may be thought of as conducting a variation of a zero knowledge proof, as accumulator 10 proves to verifier 40 its knowledge of personal information of user 20 without revealing this personal information to verifier 40. The accumulator 10 improves on conventional zero knowledge proof processes, however, by additionally verifying the personal information and proof with user 20 (and optionally issuer 30), and by carrying out the verification process using secure, e.g., hashed and encrypted, information.

Figure 4:
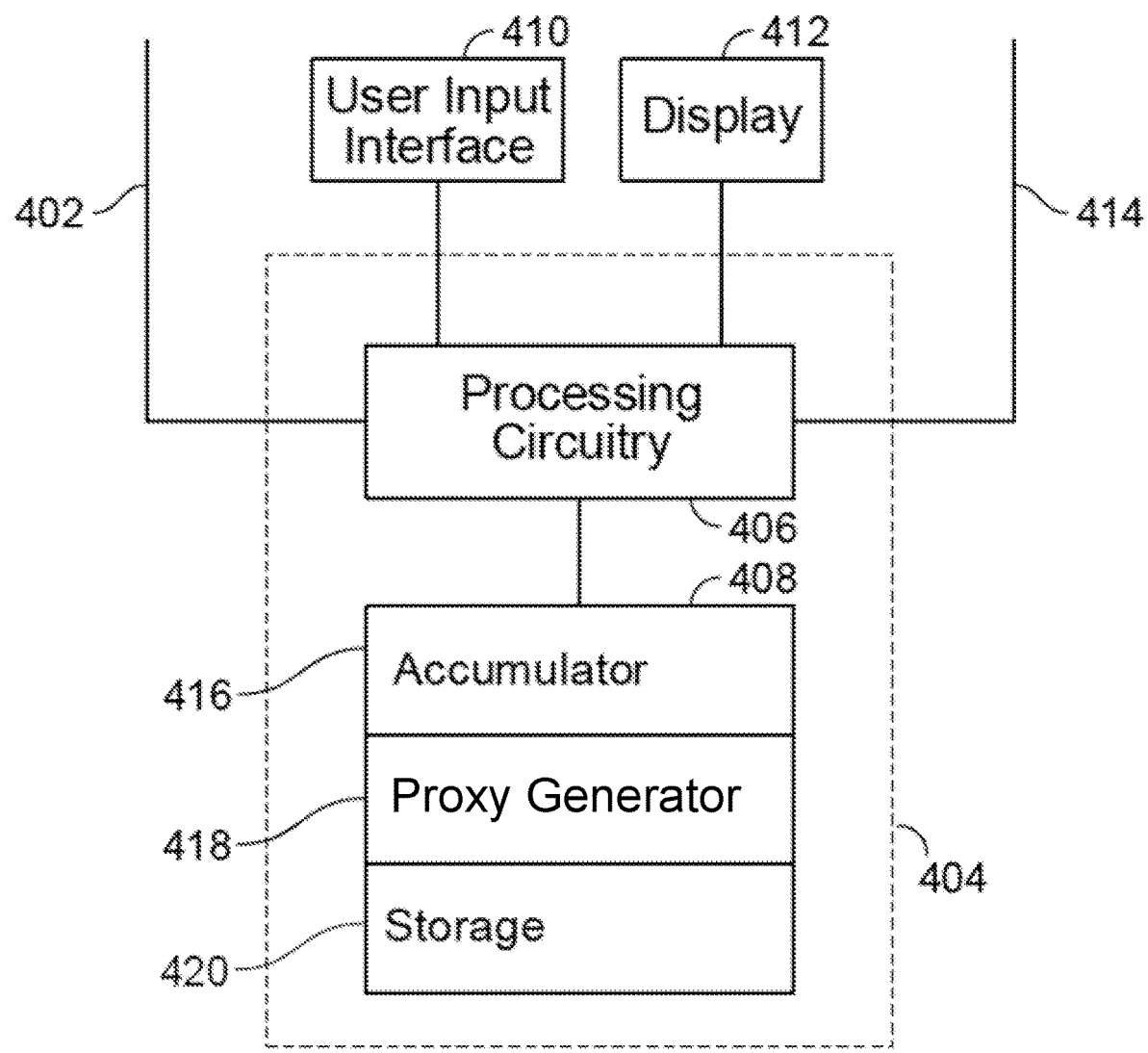
FIG. 4 is a generalized embodiment of an illustrative processing system constructed for use in accordance with some embodiments of the present disclosure.

FIG. 4 is a generalized embodiment of an illustrative electronic computing device constructed for use according to embodiments of the disclosure. Here, computing device 400 may be any device capable of carrying out operations of embodiments of the disclosure. In particular, computing device 400 may execute the above described secure multi-party verification processes, to verify user 20 information without disclosing that information to requestors. That is, computing device 400 may implement one or more accumulators 10 to carry out these multi-party authentication processes.

As a nonlimiting example, computing device 400 may be a system on chip (SoC), embedded processor or microprocessor, or the like. Computing device 400 may transmit and receive data via input/output (hereinafter 'I/O') paths 402 and 414, which may be in electronic communication with any other device, e.g., through an electronic communications medium such as the public Internet. I/O path 402 may provide data (e.g., image data from camera 310 or the like) and other input to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths. I/O functions may be provided by one or more of these communications paths but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., multiple NVIDIA® Tegra™ or Volta™ processors, Intel® Core™ processors, or the like) or multiple different processors (e.g., an Intel® Nervana™ processor and an NVIDIA® Volta™ processor, etc.). Any type and structure of processing circuitry may be employed. For example, processing circuitry 406 may include a multi-core processor, a multi-core processor structured as a graphics or computation pipeline for carrying out operations in parallel, a neuromorphic processor, any other parallel processor or graphics processor, or the like. In at least one embodiment, processing circuitry 406 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor or graphics processor, for example.

In some embodiments, control circuitry 404 executes instructions for secure authentication, where these instructions may be embedded instructions or may be part of an application program running on an operating system. In at least one embodiment, computing device 100 may execute a version of the WINDOWS operating system available from Microsoft Corporation of Redmond, Wash., although other operating systems (UNIX and Linux for example), embedded software, and/or graphical user interfaces may also be used.

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Storage 408 may be used to store code modules as described below. Nonvolatile memory may also be used (e.g., to launch a boot-up routine and other instructions). Cloud-based storage may be used to supplement storage 408 or instead of storage 408.

Storage 408 may also store instructions or code for the above described secure multi-party authentication processes, to conduct the operations of embodiments of the disclosure. In operation, processing circuitry 406 may retrieve and execute the instructions stored in storage 408, to conduct the processes herein.

Storage 408 is a memory that stores a number of programs or instruction modules for execution by processing circuitry 406. In particular, storage 408 may store an accumulator 416, a proxy generator 418, and a storage 420. The accumulator 416 may be a set of instructions for implementing accumulator 10, to receive and store user 20 confidential information, instruct the generation or proxy information, and carry out multi-party verification processes as above. Proxy generator 418 may be a set of instructions for generating proxy values or information for each received proof, and thus may implement one or more encryption routines for encrypting proofs and decrypting proofs in response to instructions from accumulator 416. Storage 420 may be any storage for storing confidential information of users 20 and received proofs and proxy values. Given the nature of this stored information, at least some embodiments of the disclosure implement storage 420 as a secure storage. Further, embodiments of the disclosure contemplate storage 420 as a local storage such as a partition or other portion of storage 408, or a remote storage implemented in a remote device such as a remote database, or remote computing device such as a secure server or the like.

The computing device 400 may be standalone computing device such as a desktop or laptop computer, a server computer, or the like. However, embodiments of the disclosure are not limited to this configuration, and contemplate other implementations of computing device 400. For example, computing device 400 may be a remote computing device in wired or wireless communication with another electronic computing device via an electronic communications network such as the public Internet. In such latter embodiments, a user may remotely instruct computing device 400 to implement the processes described herein, to select program versions for execution on device 400.

Figure 5:
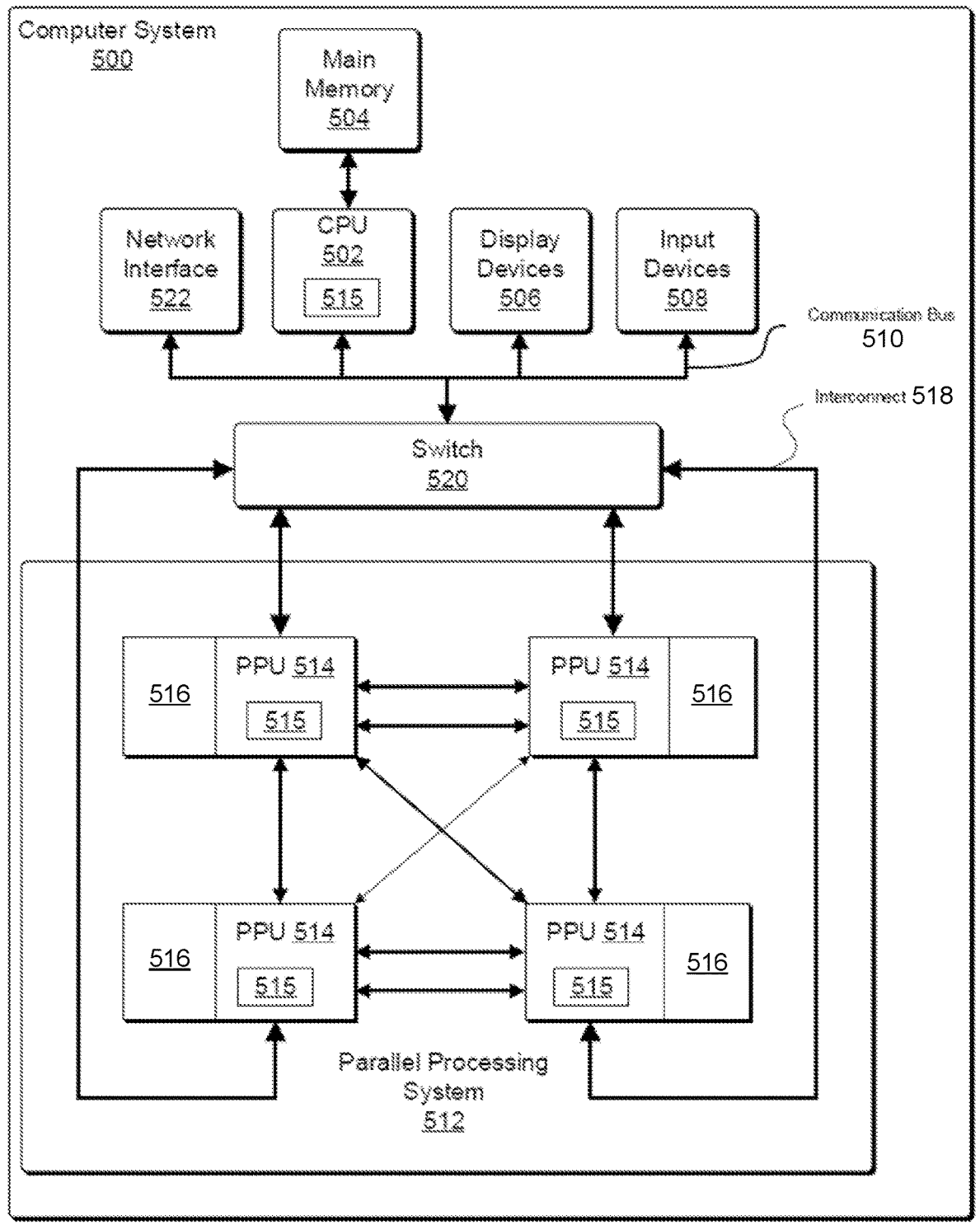
FIG. 5 is a generalized embodiment of a further processing system constructed for use in accordance with some embodiments of the present disclosure.

Computing device 400 may be any electronic computing device capable of carrying out secure multi-party authentication processes. For example, computing device 400 may be an embedded processor, a microcontroller, a local or remotely located desktop computer, tablet computer, or server in electronic communication with camera 90 and actuator 70, or the like. Furthermore, the computing device 400 may have any configuration or architecture that allows it to select and execute program versions according to embodiments of the disclosure. FIG. 5 illustrates one such configuration, in which computing device 400 is shown as a computer system 500 that is constructed with a parallel processing architecture for parallel processing of selected program versions. The computer system 500 of FIG. 5 may be employed, for example, in embodiments of the disclosure that use methods and processes for selecting programs and executing them. In at least one embodiment, computer system 500 comprises, without limitation, at least one central processing unit ("CPU") 502 that is connected to a communication bus 510 implemented using any suitable protocol, such as PCI ("Peripheral Component Interconnect"), peripheral component interconnect express ("PCI-Express"), AGP ("Accelerated Graphics Port"), Hyper-Transport, or any other bus or point-to-point communication protocol(s). In at least one embodiment, computer system 500 includes, without limitation, a main memory 504 which may be any storage device, and control circuitry or logic (e.g., implemented as hardware, software, or a combination thereof). Data are stored in main memory 504 which may take the form of random access memory ("RAM"). In at least one embodiment, a network interface subsystem ("network interface") 522 provides an interface to other computing devices and networks for receiving data from and transmitting data to other systems from computer system 500. Logic 515 is used to perform computational operations associated with one or more embodiments, and may be any processing circuitry. In particular, logic 515 may include, without limitation, code and/or data storage to store input/output data, and/or other parameters for carrying out any computational operations. Logic 515 may also include or be coupled to code and/or data storage to store code or other software to control timing and/or order of operations. Logic 515 may further include integer and/or floating point units (collectively, arithmetic logic units or ALUs) for carrying out operations on retrieved data as specified by stored code. In at least one embodiment, any portion of code and/or data storage may be included with other on-chip or off-chip data storage, including a processor's L1, L2, or L3 cache or system memory.

In at least one embodiment, parallel processing system 512 includes, without limitation, a plurality of parallel processing units ("PPUs") 514 and associated memories 516. These PPUs 514 may be connected to a host processor or other peripheral devices via an interconnect 518 and a switch 520 or multiplexer. In at least one embodiment, parallel processing system 512 distributes computational tasks across PPUs 514 which can be parallelizable—for example, as part of distribution of computational tasks across multiple graphics processing unit ("GPU") thread blocks. Memory may be shared and accessible (e.g., for read and/or write access) across some or all of PPUs 514, although such shared memory may incur performance penalties relative to use of local memory and registers resident to a PPU 214. In at least one embodiment, operation of PPUs 514 is synchronized through use of a command such as _syncthreads( ), wherein all threads in a block (e.g., executed across multiple PPUs 514) are to reach a certain point of execution of code before proceeding.

Figure 6:
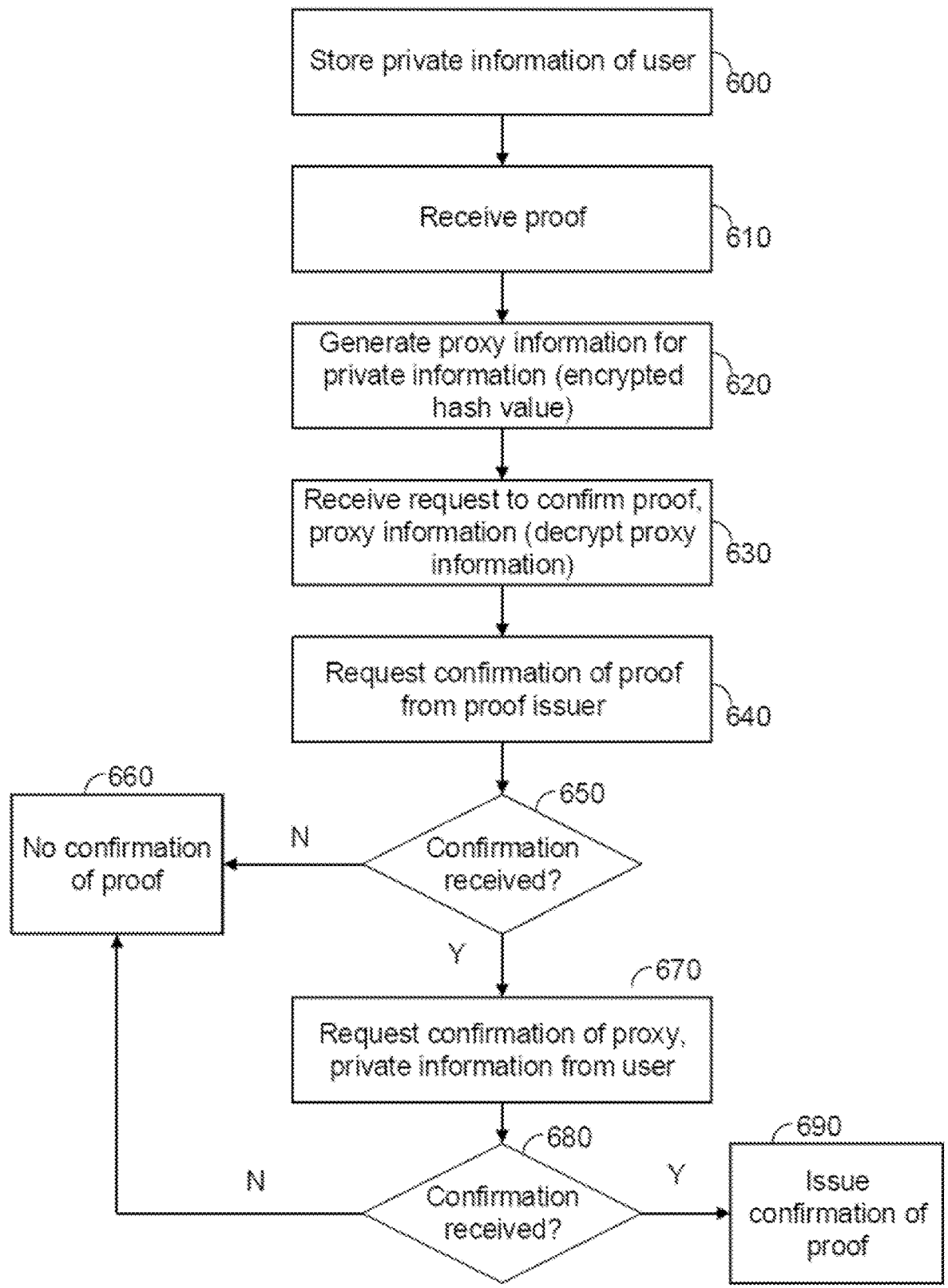
FIG. 6 is a flowchart illustrating process steps for performing multi-party authentication without disclosing confidential information, in accordance with some embodiments of the present disclosure.

FIG. 6 is a flowchart illustrating process steps for performing multi-party authentication without disclosing confidential information, according to embodiments of the disclosure. Initially, for authentication purposes, accumulator 416 may receive and store private or confidential information of a user 20 in storage 420 (Step 600), which may be any information that a user 20 does not wish to be widely disseminated, e.g., personal identifiers such as driver's license numbers, social security numbers, bank account numbers, or the like.

When accumulator 416 receives a proof from an issuer 30 (Step 610), accumulator 416 stores the proof in storage 420 and generates proxy information for the stored proof (Step 620). Accumulator 416 may instruct proxy generator 418 to generate proxy information in any manner, such as by generating a hash or salted hash of the proof. For further security, accumulator 416 may encrypt the proxy information, such as by executing a computer-implemented (or other method not practically performed in the human mind) encryption routine to encrypt the proof. As an example, proxy generator 418 may implement an RSA-2048 encryption routine to encrypt the proxy and generate a public key, where the encrypted proxy and public key are returned to issuer 30. The issuer may then hand the proxy and key to any verifier 40 who may be interested in verifying or confirming the proof, as well as to the user 20 if desired. In some embodiments, and for security purposes, the accumulator 416 may not store the proof, but may instead only store the proxy. For example, hashes or salted hashes of proofs may be stored, but not the proofs themselves, where the proofs may be later generated from the hashes or salted hashes if desired. Furthermore, as certain encryption processes become less secure or are supplanted by more secure methods, encrypted information may be re-encrypted using such more secure methods. That is, embodiments of the disclosure include re-encryption of data such as proofs by more secure methods, to ensure the security of accumulator 416 over time.

When the verifier 40 seeks to verify the proof, he or she may submit a verification request to the accumulator 416, along with the proxy. The accumulator 416 receives this information (Step 630), decrypts the proxy perhaps with an associated key, and may compare the decrypted result to the stored proxy. If no match exists, the accumulator 416 may inform the verifier 40 that the proof is not verified. If however a match exists, the accumulator 416 proceeds to verify the proof by requesting verification from both the issuer 30 and user 20. More specifically, the accumulator 416 requests confirmation of the proof from the issuer 30 (Step 640), where confirmation may include confirming the proxy, confirming both the contents of the proof and its association with user 20, or the like. The accumulator 416 may check to determine whether such confirmation was received (step 650) and if not, such as if the issuer 30 is unable to confirm or upon a timeout, the accumulator 416 informs the verifier 40 that the proof could not be confirmed (Step 660). Conversely, if confirmation was timely received, i.e., if the accumulator 416 has successfully confirmed the proof with the issuer 30, the accumulator 416 also attempts to confirm the proxy and identity of the user 20 (Step 670). Here, confirmation may include confirming the identity of user 20 and the proxy, so as to confirm that user 20 is indeed the intended recipient of the proof. Confirmation of identity may be confirmed by requesting that the user 20 verify the corresponding personal or confidential information stored by accumulator 416. Thus, the accumulator 416 may determine whether confirmation of identity and proxy are received (Step 680). If confirmation was not accomplished, such as if the user 20 was unable to confirm the stored personal information or the decrypted proxy did not match the stored proxy, the accumulator 416 may return to Step 660 and inform the verifier 40 that the proof could not be verified. Conversely, if confirmation was achieved with user 20, the accumulator 416 may issue confirmation or verification of the proof to verifier 40 (Step 690).

Embodiments of the disclosure encompass any use or application of the multi-party authentication or verification processes described. As above, the verification processes of embodiments of the disclosure may be employed to verify medical or pharmaceutical prescriptions, with the issuer 30 issuing a prescription for user 20. The prescription would be stored as a proof in accumulator 10, which can generate a hash, generate the proxy as an encryption of the hash, and return the proxy to the issuer 30 for transmission with the prescription. Verifier 40, which may be a pharmacist, can submit the prescription and proxy to the accumulator 10 for confirmation, whereupon the accumulator 10 may confirm the prescription contents and identity of the recipient (user 20) by separately querying both the doctor (issuer 30) and prescription recipient. Notably, user 20 confirmation is accomplished by verification of private information of user 20 with accumulator 10, rather than with the pharmacist. That is, the pharmacist asks accumulator 10 to confirm the prescription, with user 20 showing his or her identification to the accumulator 10 (along with his or her copy of the proxy) rather than to the pharmacist. Once the accumulator 10 has verified the prescription with the doctor and the user's identity with the user 20, the accumulator 10 informs the pharmacist that the prescription is confirmed. This allows for trusted verification of the prescription to the pharmacist, without the need for the user 20 to disclose his or her personal information to the pharmacist.

Further advantages may be provided when multiple issuers 30 exist, such as when multiple doctors issue prescriptions for the same user 20. Here, accumulator 10 may verify the prescription with both the user 20 and with every issuer 30. That is, a particular prescription may be verified with every doctor, regardless of whether that doctor issued that prescription. Verification may thus include a determination of whether the new prescription has any negative interactions with each other existing prescription, without requiring a disclosure of every prescribed medication to any party. As an example, verification may include a query as to whether each doctor is aware of any interactions between the medication he or she is currently prescribing, and the new medication.

Embodiments of the disclosure may also be applied to online advertisement provisioning. As an example, various ad services may act as issuers 30, submitting to accumulator 10 and provisioning contracts for a particular party, user 20. A new ad service may then act as verifier 40, requesting accumulator 10 to verify whether a particular party, or user 20, is already a member of another service or not. The accumulator 10 may then verify with each issuer 30 whether user 20 is a member of their service. If any issuer 30 confirms that this is the case, accumulator 10 may inform the verifier 40 that user 20 is already contracted with another service, without informing the verifier 40 as to the identity of that service. The new ad service, verifier 40, may then determine not to issue ads to that user 20. In this manner, new ad services may confirm whether it is proper to send ads to a particular target, without being informed of the identity of any other service to which the target may be contracted.

Figure 7:
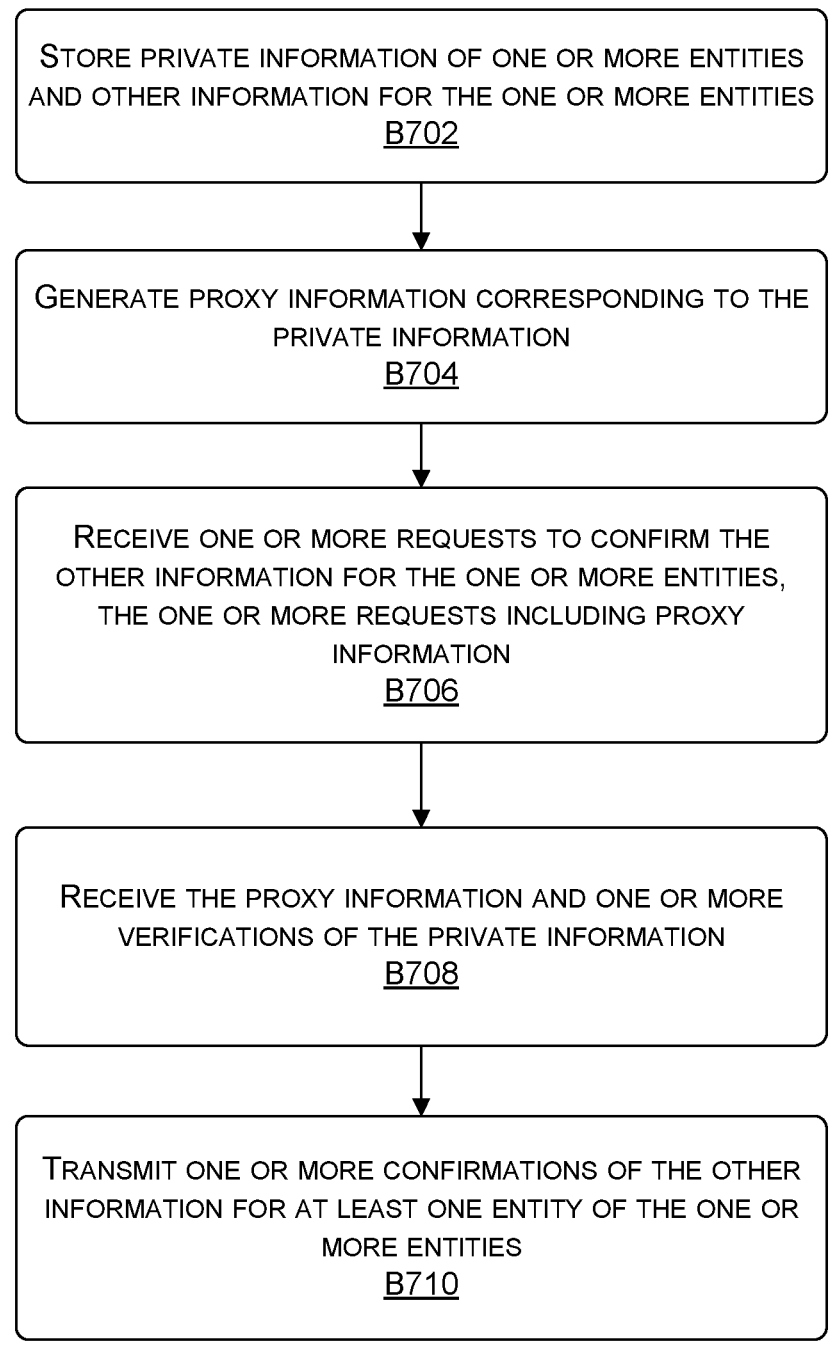
FIG. 7 is a flow diagram showing a method for securely verifying information for an entity without conveying private information of the entity, in accordance with some embodiments of the present disclosure.

Now referring to FIG. 7, each block of method 700, and other methods described herein, may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods are described, by way of example, with respect to particular figures. However, the methods may additionally or alternatively be executed by any one system, or any combination of systems, including, but not limited to, those described herein.

FIG. 7 is a flow diagram showing a method 700 for securely verifying information for an entity without conveying private information of the entity, in accordance with some embodiments of the present disclosure. The method 700, at block B702, includes storing private information of one or more entities and other information for the one or more entities. For example, using processing circuitry, the accumulator 10 may store private information of one or more entities, such as the user 20, and other information for the one or more entities, such as the user 20.

At block B704, the method 700 includes generating proxy information corresponding to the private information. For example, the proxy generator 418 may generate proxy information corresponding to the private information.

At block B706, the method 700 includes receiving one or more requests to confirm the other information for the one or more entities, the one or more requests including proxy information. For example, the accumulator 10 may receive, from one or more requestors, such as the verifier 40, one or more requests to confirm the other information for the one or more entities, such as the user 20, the one or more requests including the proxy information.

At block B708, the method 700 includes receiving the proxy information and one or more verifications of the private information. For example, the accumulator 10 may receive, from the one or more entities, such as the user 20, the proxy information and one or more verifications of the private information.

At block B710, the method 700 includes transmitting one or more confirmations of the other information for at least one entity of the one or more entities. For example, the accumulator 10 may, after receiving the one or more verifications, transmit to at least one requestor of the one or more requestors, such as the verifier 40, one or more confirmations of the other information for at least one entity of the one or more entities, such as the user 20, without providing the private information of the one or more entities.

Example Computing Device

Figure 8:
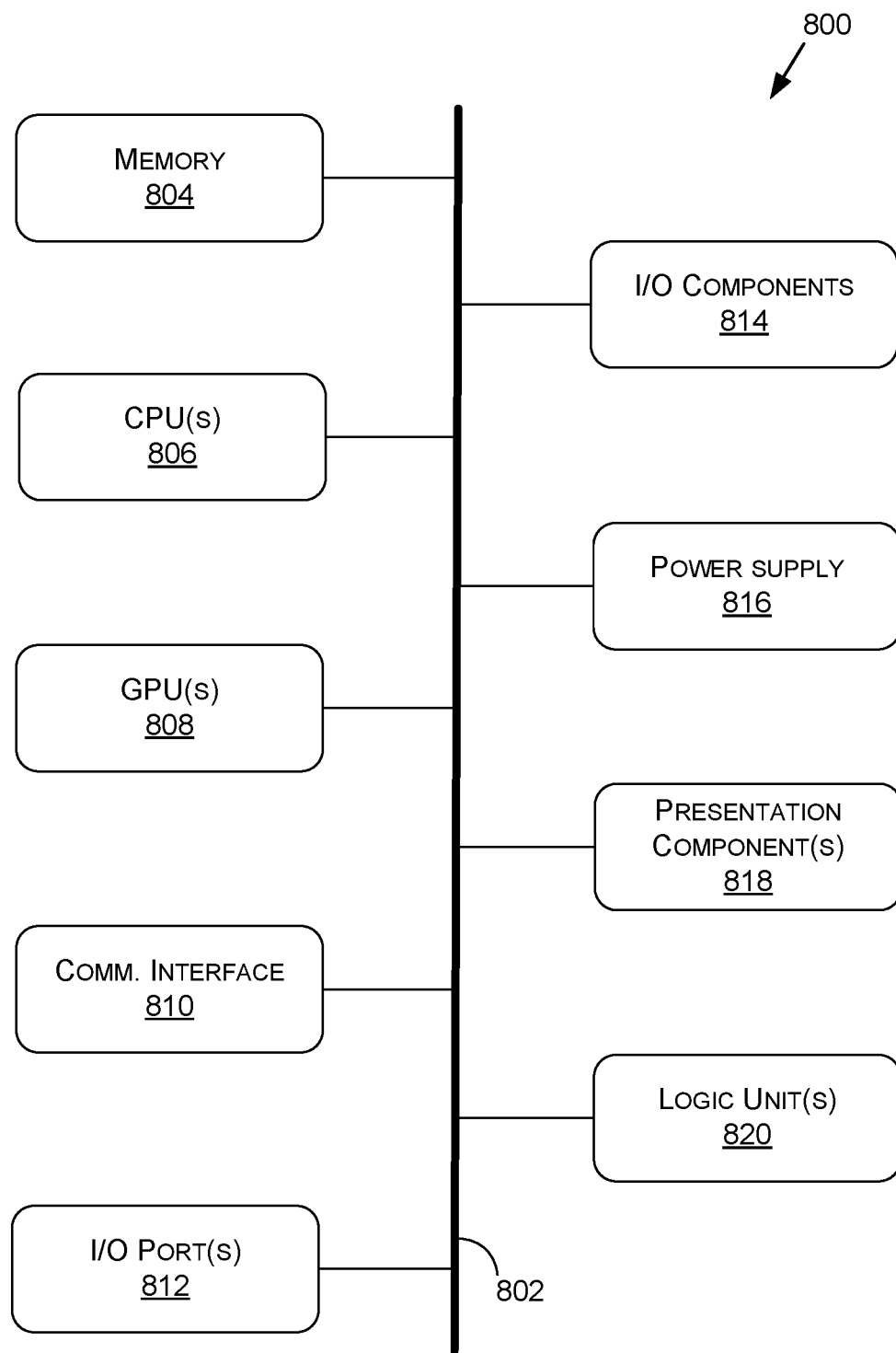
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

Example Data Center

Figure 9:
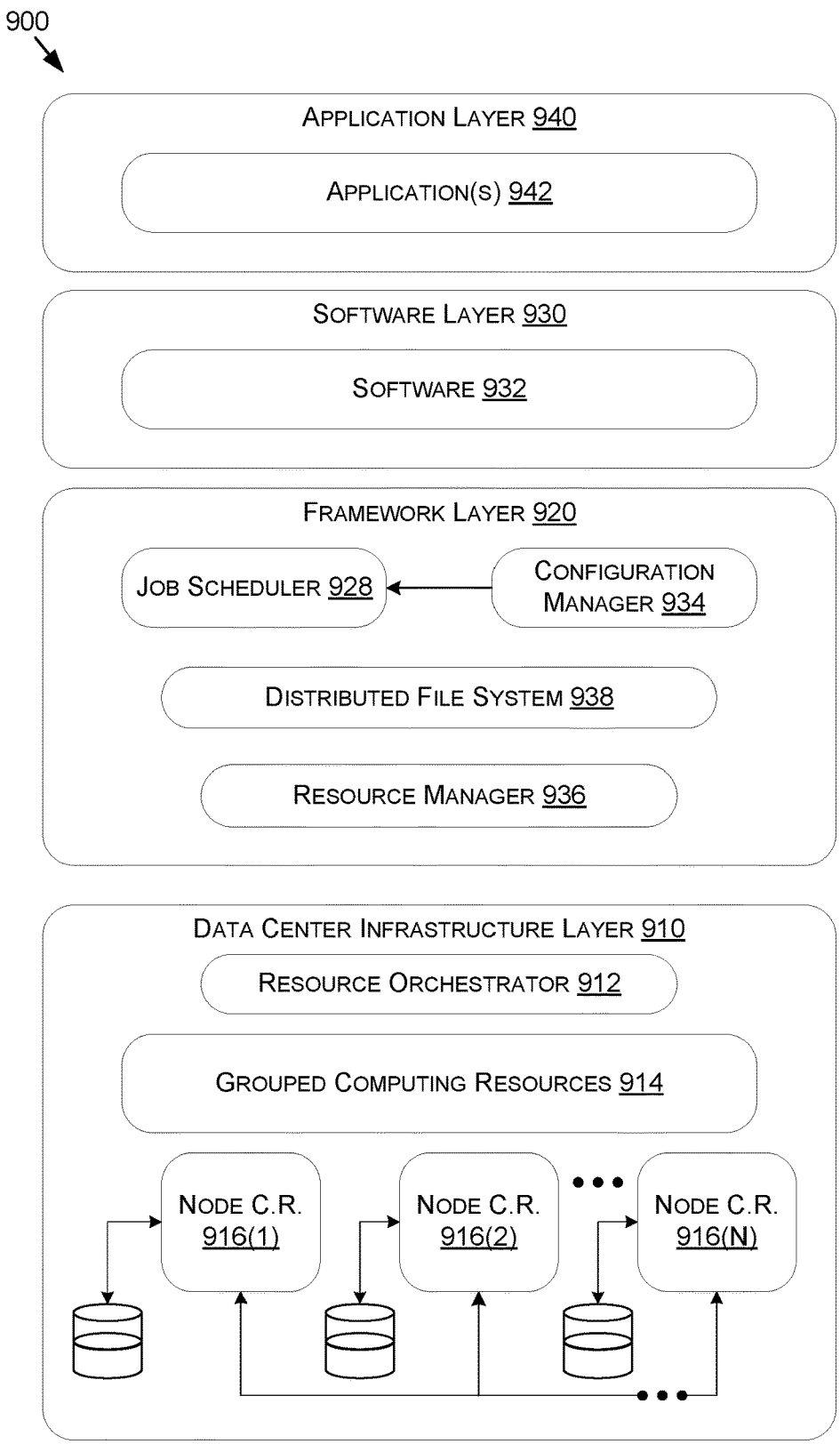
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 928, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 928 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 928. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
using processing circuitry, based at least on receiving entity information for one or more first entities, generating, by one or more second entities, proxy information corresponding to the entity information;
providing, by the one or more second entities, the proxy information to the one or more first entities;
receiving, by the one or more second entities and from one or more third entities, one or more requests to confirm the entity information for the one or more first entities, the one or more requests including the proxy information;
receiving, by the one or more second entities and from the one or more first entities, the proxy information and one or more verifications of private information associated with the proxy information; and
after the receiving of the one or more verifications, transmitting to at least one entity of the one or more third entities, one or more confirmations of the entity information for at least one entity of the one or more first entities without providing the private information.

2. The method of claim 1, wherein the receiving of the entity information is from one or more fourth entities based at least on the one or more fourth entities issuing the entity information to the one or more first entities.

3. The method of claim 1, wherein the private information is known to the one or more second entities.

4. The method of claim 1, wherein the one or more second entities generate the one or more confirmations based at least on decrypting the proxy information received from the one or more third entities and comparing the decrypted proxy information to the entity information.

5. The method of claim 1, wherein the proxy information comprises one or more hash values.

6. The method of claim 5, wherein the one or more hash values include at least one encrypted hash value.

7. The method of claim 1, wherein the private information comprises one or more of a driver's license number, a social security number, or an account number.

8. A system comprising:
parallel processing circuitry of one or more first entities to:
receive private information of one or more second entities and entity information for the one or more second entities;
generate proxy information corresponding to the entity information;
receive, from one or more requestors, one or more requests to confirm the entity information for the one or more second entities, the one or more requests including the proxy information;
receive, from the one or more second entities, the proxy information and one or more verifications of the private information; and
after receiving the one or more verifications, transmit to at least one requestor of the one or more requestors, one or more confirmations of the entity information for at least one entity of the one or more second entities without providing the private information.

9. The system of claim 8, wherein the one or more requestors are further to verify the entity information based at least on the one or more requestors decrypting the proxy information using a public key provided from the one or more first entities.

10. The system of claim 8, wherein the entity information for the one or more second entities is information from a plurality of providers.

11. The system of claim 10, wherein the parallel processing circuitry is further configured to receive, from one or more providers of the entity information, at least one verification of the entity information from each provider of the plurality of providers.

12. The system of claim 8, wherein the proxy information comprises one or more hash values.

13. The system of claim 12, wherein the one or more hash values include one or more encrypted hash values.

14. The system of claim 8, wherein the private information comprises one or more of a driver's license number, a social security number, or an account number.

15. The system of claim 8, wherein the system is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system for presenting at least one of virtual reality content, augmented reality content, or mixed reality content;
a system incorporating one or more virtual machines (VMs);
a system implemented at least partially in a data center; or
a system implemented at least partially using cloud computing resources.

16. At least one processor comprising:
one or more circuits of one or more first entities to:
receive private information of one or more second entities and entity information for the one or more second entities;
generate proxy information corresponding to the entity information;
receive, from one or more requestors, one or more requests to confirm the entity information for the one or more second entities, the one or more requests including the proxy information;
receive, from the one or more second entities, the proxy information and one or more verifications of the private information; and
after receiving the one or more verifications, transmit to at least one requestor of the one or more requestors, one or more confirmations of the entity information for at least one entity of the one or more second entities without providing the private information.

17. The at least one processor of claim 16, wherein the one or more requestors are further to verify the entity information based at least on the one or more requestors decrypting the proxy information using a public key provided from the one or more first entities.

18. The at least one processor of claim 16, wherein the entity information for the one or more second entities is information from a plurality of providers.

19. The at least one processor of claim 18, wherein the one or more circuits are further to receive, from one or more providers of the entity information, at least one verification of the entity information from each provider of the plurality of providers.

20. The at least one processor of claim 16, wherein the proxy information comprises one or more hash values.

21. The at least one processor of claim 20, wherein the one or more hash values include one or more encrypted hash values.

22. The at least one processor of claim 16, wherein the private information comprises one or more of a driver's license number, a social security number, or an account number.

23. The at least one processor of claim 16, wherein the one or more first entities include one or more servers, and the one or more second entities include one or more of a user account, a user device, or a client device.

24. The at least one processor of claim 16, wherein the processor is comprised in at least one of:
- a control system for an autonomous or semi-autonomous machine;
- a perception system for an autonomous or semi-autonomous machine;
- a system for performing simulation operations;
- a system for performing digital twin operations;
- a system for performing light transport simulation;
- a system for performing collaborative content creation for 3D assets;
- a system for performing deep learning operations;
- a system implemented using an edge device;
- a system implemented using a robot;
- a system for performing conversational AI operations;
- a system for generating synthetic data;
- a system for presenting at least one of virtual reality content, augmented reality content, or mixed reality content;
- a system incorporating one or more virtual machines (VMs);
- a system implemented at least partially in a data center; or
- a system implemented at least partially using cloud computing resources.

* * * * *